United States Patent
McKinnon et al.

(10) Patent No.: US 10,457,182 B2
(45) Date of Patent: Oct. 29, 2019

(54) INTEGRATED DOOR FRAME AND HANDLE BRACKET

(71) Applicant: LIPPERT COMPONENTS, INC., Elkhart, IN (US)

(72) Inventors: Scott C. McKinnon, Union City, MI (US); David A. Lehman, Lancaster, PA (US)

(73) Assignee: LIPPERT COMPONENTS, INC., Elkhart, IN (US)

( * ) Notice: Subject to any disclaimer, the term of this patent is extended or adjusted under 35 U.S.C. 154(b) by 250 days.

(21) Appl. No.: 15/386,822

(22) Filed: Dec. 21, 2016

(65) Prior Publication Data

US 2017/0182919 A1 Jun. 29, 2017

Related U.S. Application Data (60) Provisional application No. 62/271,628, filed on Dec. 28, 2015.

(51) Int. Cl.
*B60N 3/02* (2006.01)

(52) U.S. Cl.
CPC .................................. *B60N 3/026* (2013.01)

(58) Field of Classification Search
CPC ...................................................... B60N 3/026
USPC ..................................................... 296/102, 71
See application file for complete search history.

(56) References Cited

U.S. PATENT DOCUMENTS

| | | | | |
|---|---|---|---|---|
| 3,296,743 A | * | 1/1967 | Curl | E05D 5/0215 49/382 |
| 4,976,455 A | * | 12/1990 | Brammer, Sr. | B60P 3/36 16/319 |
| 5,116,025 A | * | 5/1992 | Kiniry | E04F 11/18 256/67 |
| 5,216,839 A | * | 6/1993 | Woodruff | E05D 5/0238 49/382 |
| 6,425,572 B1 | * | 7/2002 | Lehr | B60R 3/02 182/127 |
| 6,974,134 B1 | * | 12/2005 | Macri | B60N 3/023 16/412 |

* cited by examiner

*Primary Examiner* — Dennis H Pedder
(74) *Attorney, Agent, or Firm* — Nixon & Vanderhye P.C.

(57) ABSTRACT

A system for attaching a grab handle to a structure adjacent an opening in the structure includes a frame and a bracket attached to the frame. The bracket includes a first portion, a second portion, and a third portion. The first portion defines one or more apertures for receiving fasteners attaching a mount of the grab handle to the bracket. The second portion defines one or more apertures for receiving fasteners attaching the bracket and the door frame to the structure. The third portion may define one or more apertures for receiving fasteners attaching the bracket to the frame.

13 Claims, 11 Drawing Sheets

INTEGRATED DOOR FRAME AND HANDLE BRACKET

CROSS-REFERENCE TO RELATED APPLICATION

This application claims benefit of U.S. Provisional Patent Application No. 62/271,628, filed on Dec. 28, 2015, and incorporates by reference the disclosure thereof in its entirety.

BACKGROUND AND SUMMARY OF THE DISCLOSURE

An entry door for a recreational vehicle (RV) typically is positioned in a wall of the RV at a height above the ground on which the RV may be parked. Steps may be provided between the entry door and the ground to facilitate a user's ingress to and egress from the vehicle. A grab handle may be provided for a user to hold while climbing or descending the steps. The grab handle may be attached to a bracket that, in turn, is attached to the wall of the RV adjacent the door.

The wall structure typically is reinforced about the opening therein. For example, the wall structure about a door opening may be reinforced with a door frame including jambs to which hinges and a lock supporting and securing the door may be attachment. The adjacent wall structure, however, including the wall structure to which such a grab handle might be attached, typically is not reinforced. As such, the adjacent wall structure might not be sturdy enough to secure the handle bracket thereto without failure of the wall in the event a user places a substantial load on the handle. As such, the wall structure may need to be reinforced internally and/or backing plates may need to be provided on the inner wall surface to preclude the bracket from being pulled out of the wall. Provision of internal wall reinforcement, however, can be complicated and expensive. Provision of backing plates can be both costly and unsightly.

DETAILED DESCRIPTION OF THE DRAWINGS

References herein to orientation, for example, upper, lower, inner, outer, and the like, should be construed in a relative sense. Dimensions shown in the drawings are illustrative and not limiting.

The drawings show an illustrative system 10 including a pair of grab handle brackets 12 integrated with a door frame 14. FIGS. 1, 2, and 4-6 also show the system 10 installed in an opening in a wall 16 of a structure, for example, a door opening in a wall of an RV, a grab handle 18 attached to the grab handle brackets 12, and a door 19 hingedly attached to the door frame 14.

Figure 1:
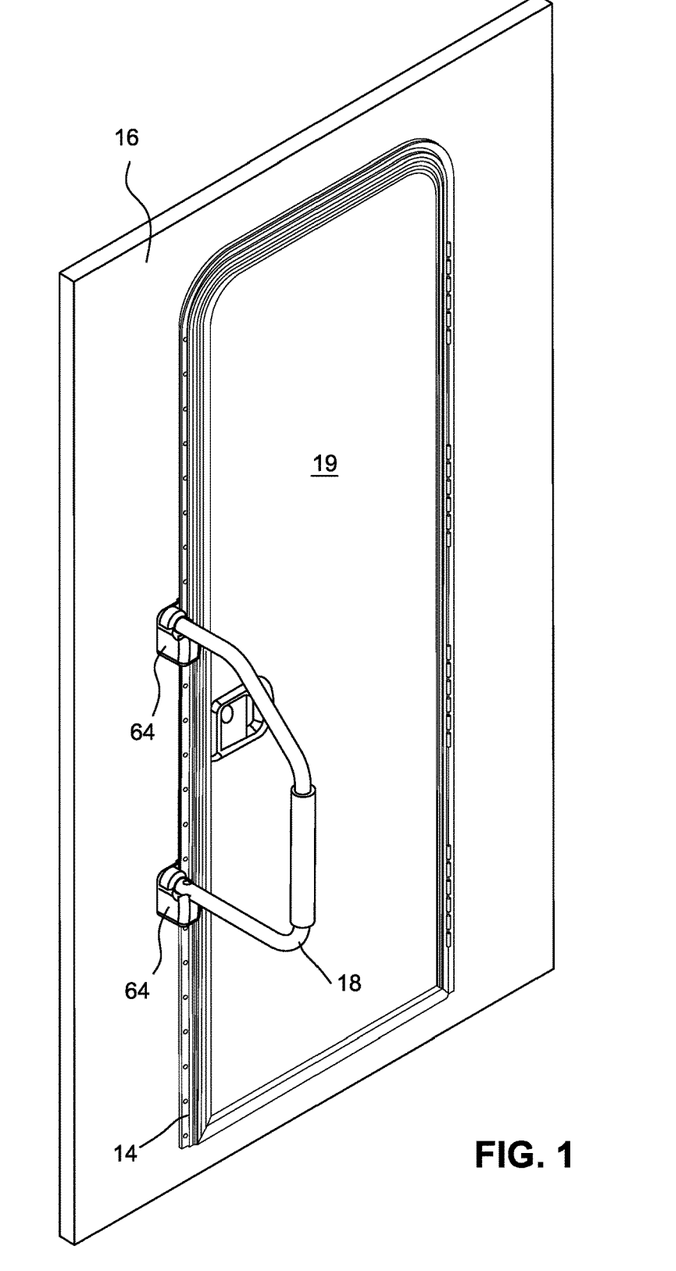
FIG. 1 is an outer perspective view of an integrated door frame and handle bracket, an associated grab handle, and an associated door installed in an opening in a wall of a structure according to the present disclosure.
Figure 2:
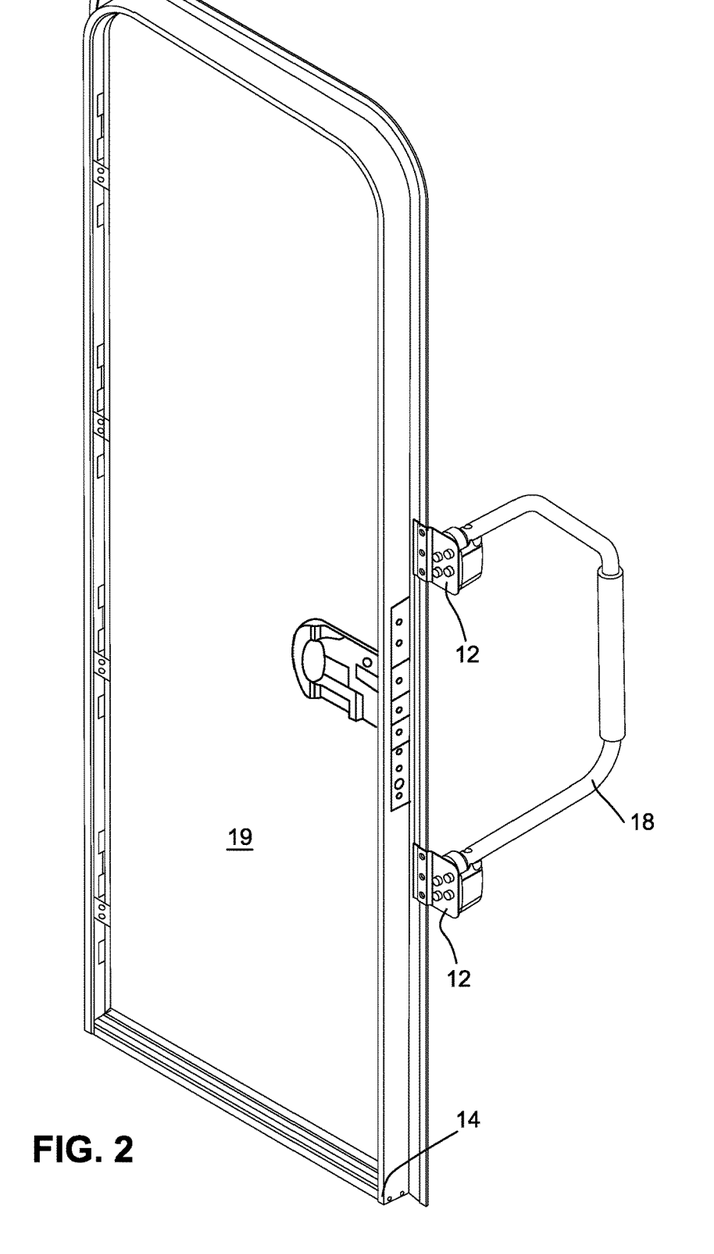
FIG. 2 is an inner perspective view of the integrated door frame and handle bracket, grab handle, and door of FIG. 1.
Figure 3:
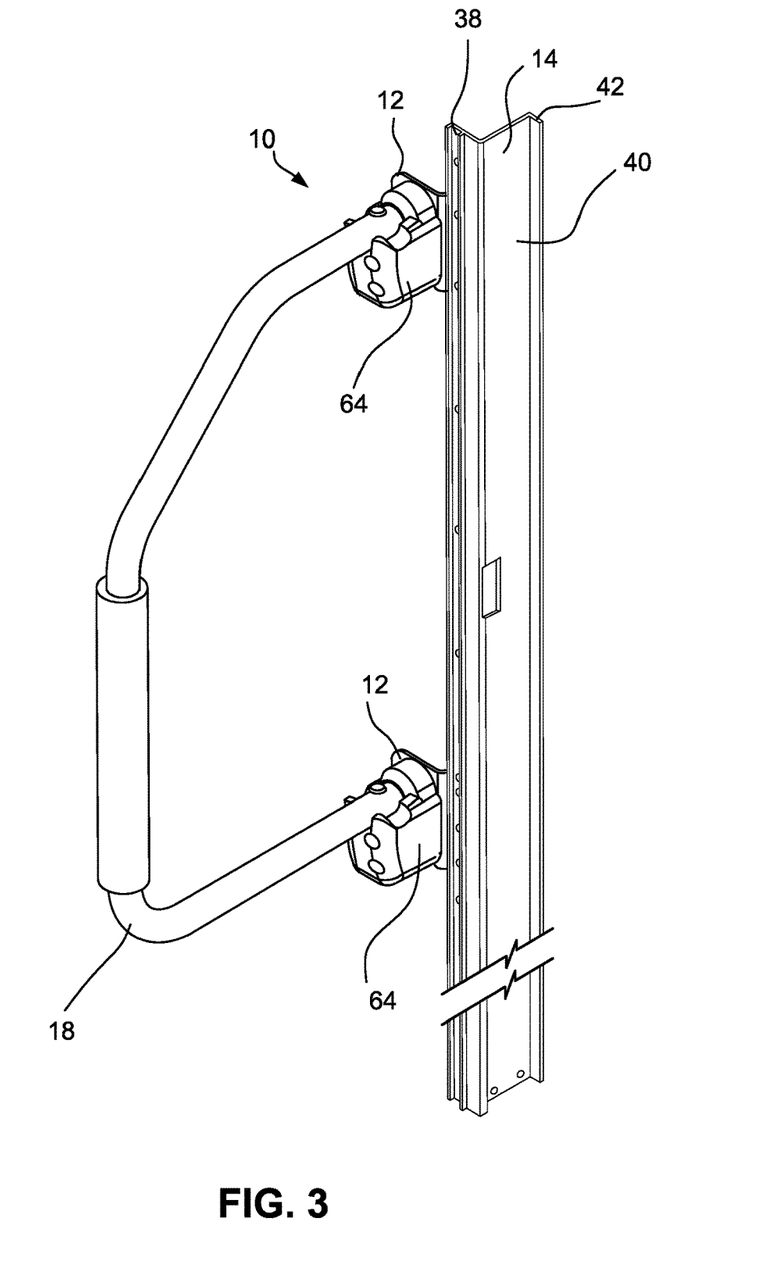
FIG. 3 is a perspective view of a portion of the integrated door frame and handle bracket and the grab handle of FIG. 1.
Figure 4:
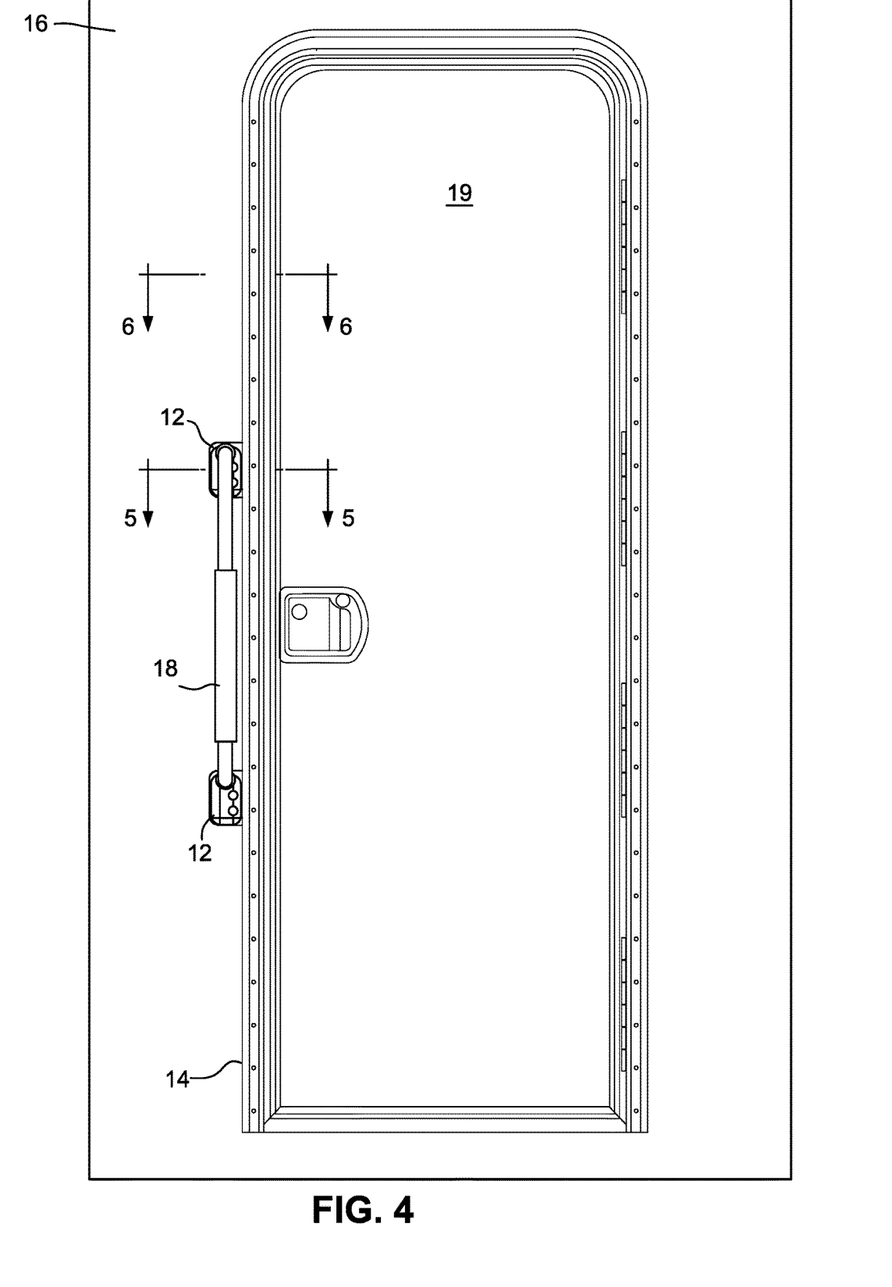
FIG. 4 is an outer elevation view of the integrated door frame and handle bracket, grab handle, and door of FIG. 1.
Figure 5:
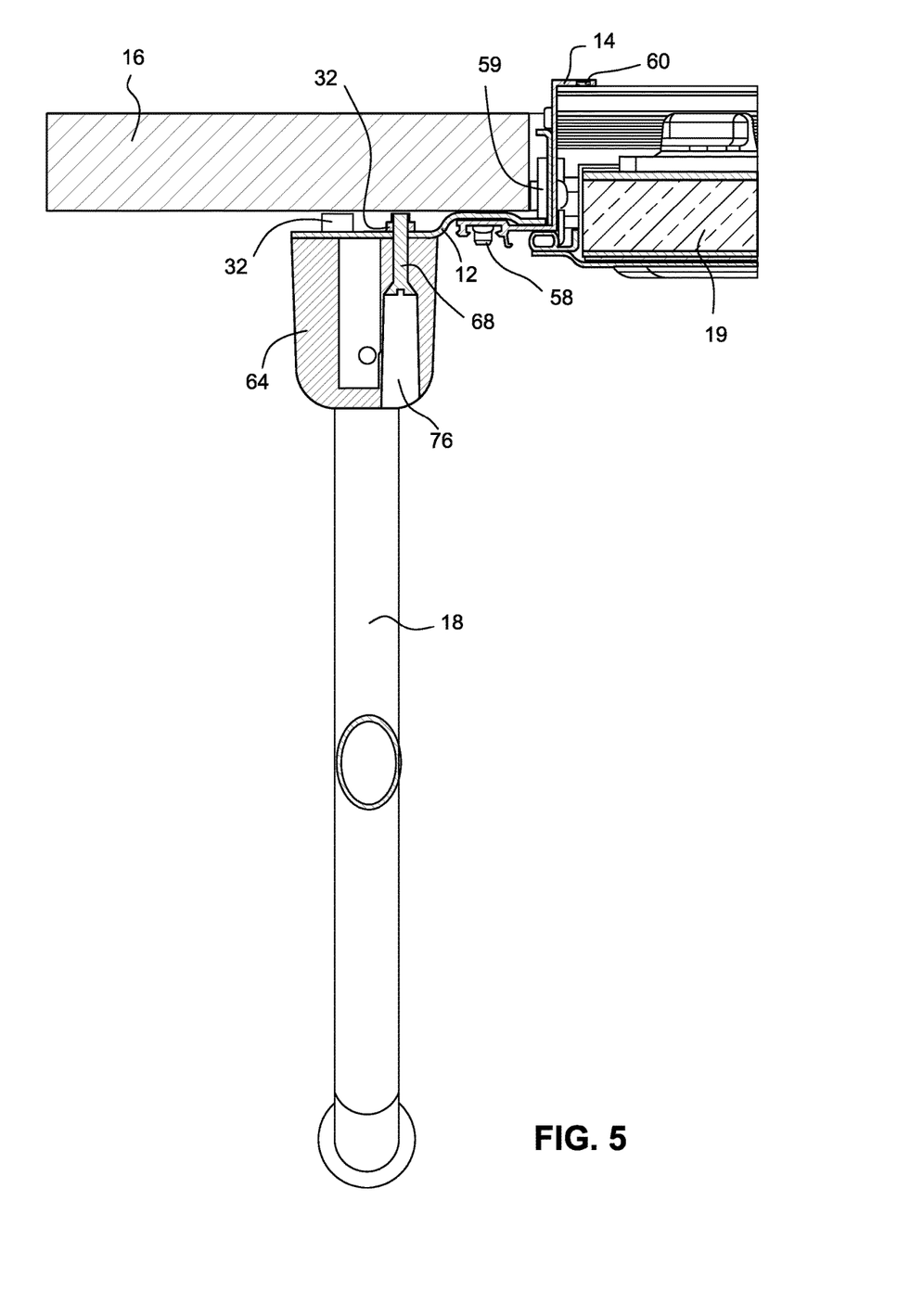
FIG. 5 is a top sectional view taken through line A-A of FIG. 4.
Figure 6:
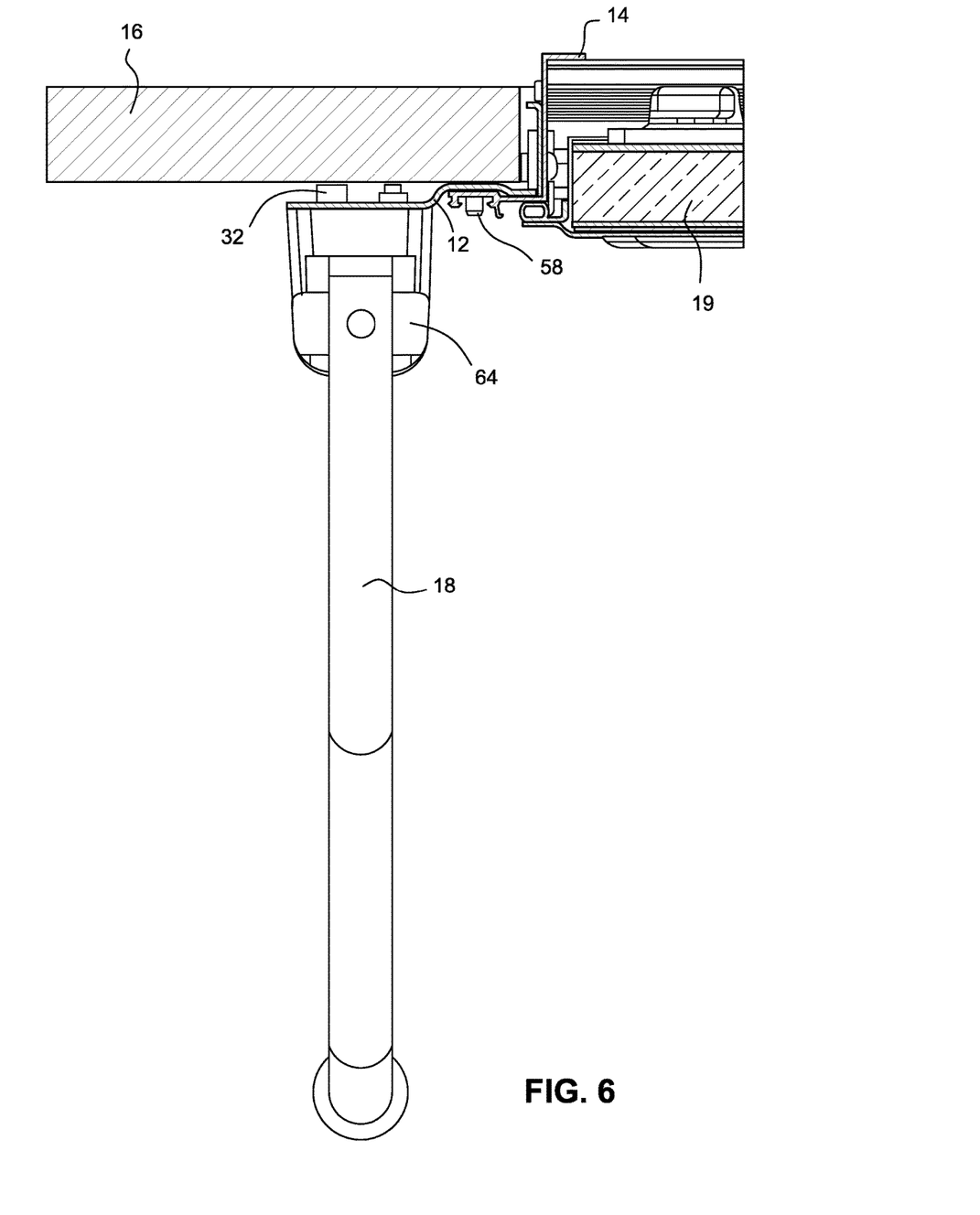
FIG. 6 is a top sectional view taken through line B-B of FIG. 4.
Figure 7:
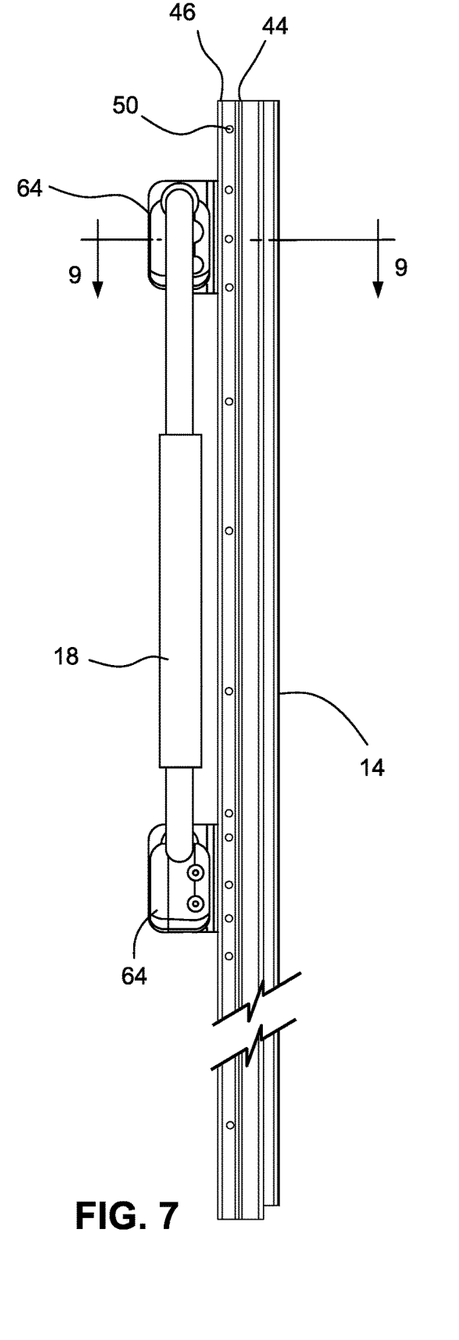
FIG. 7 is an enlarged outer elevation view of the integrated door frame and handle bracket and the grab handle of FIG. 4.
Figure 8:
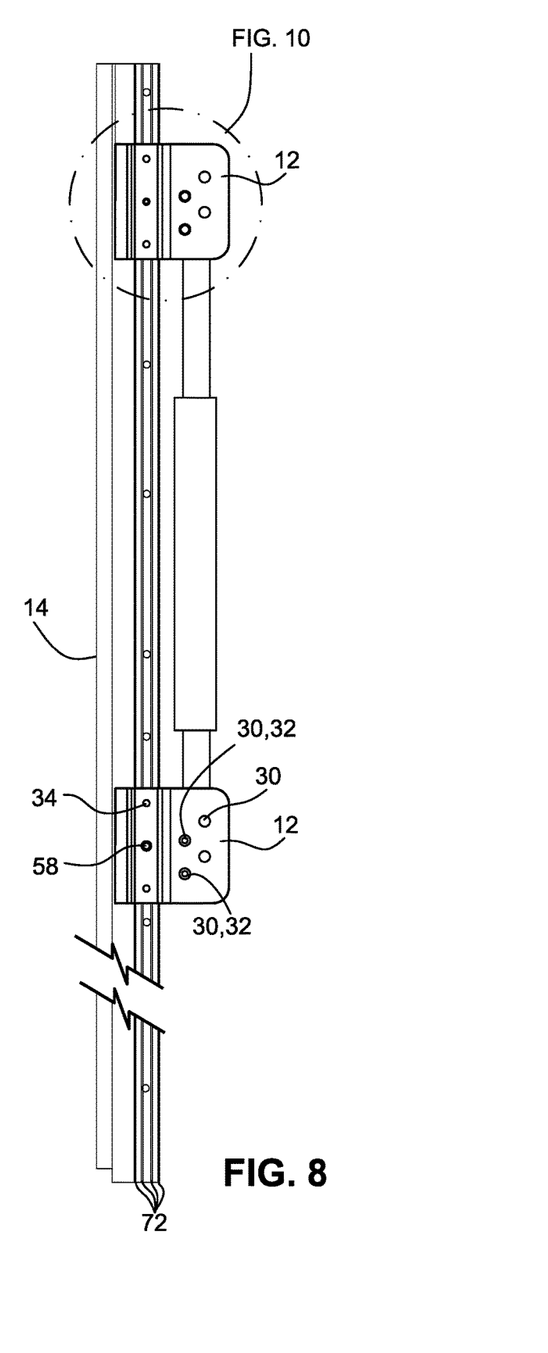
FIG. 8 is an enlarged inner elevation view of the integrated door frame and handle bracket and the grab handle of FIG. 4.
Figure 9:
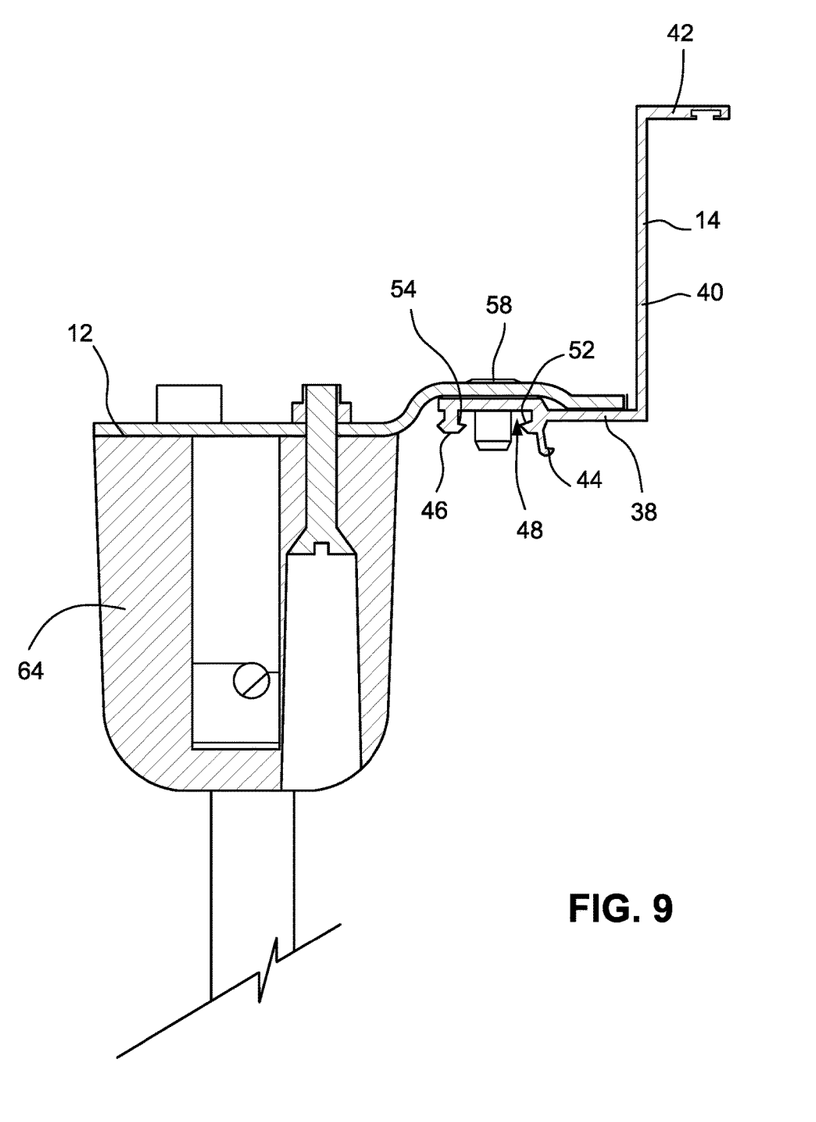
FIG. 9 is a detail sectional view of the integrated door frame and handle bracket and the grab handle of FIG. 7.
Figure 10:
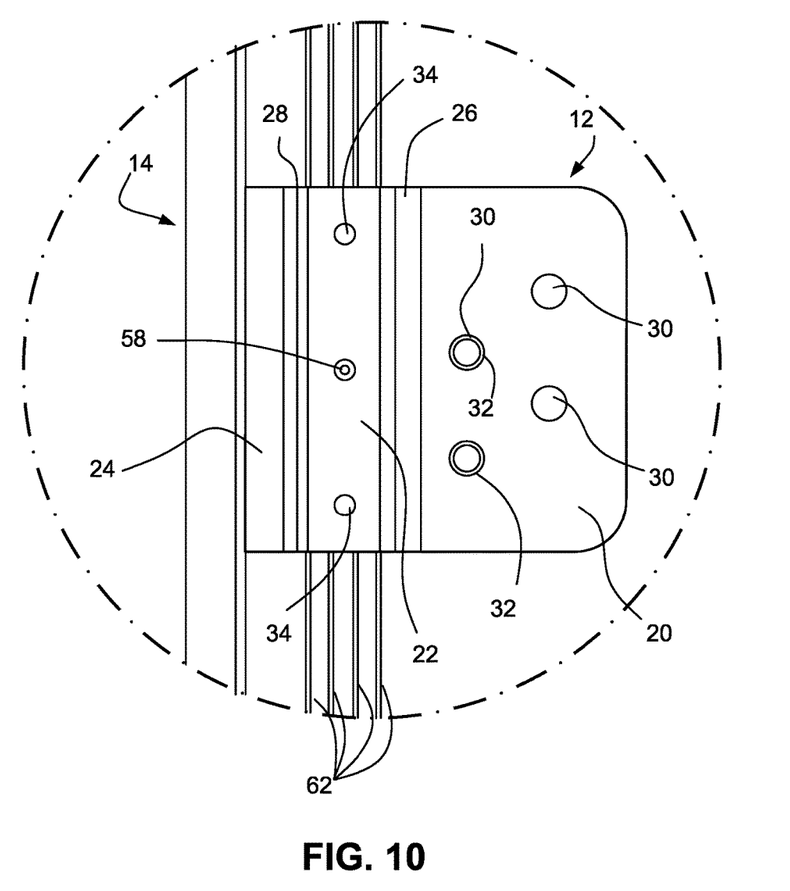
FIG. 10 is a detail inner elevation view of the integrated door frame and handle bracket of FIG. 8.
Figure 11:
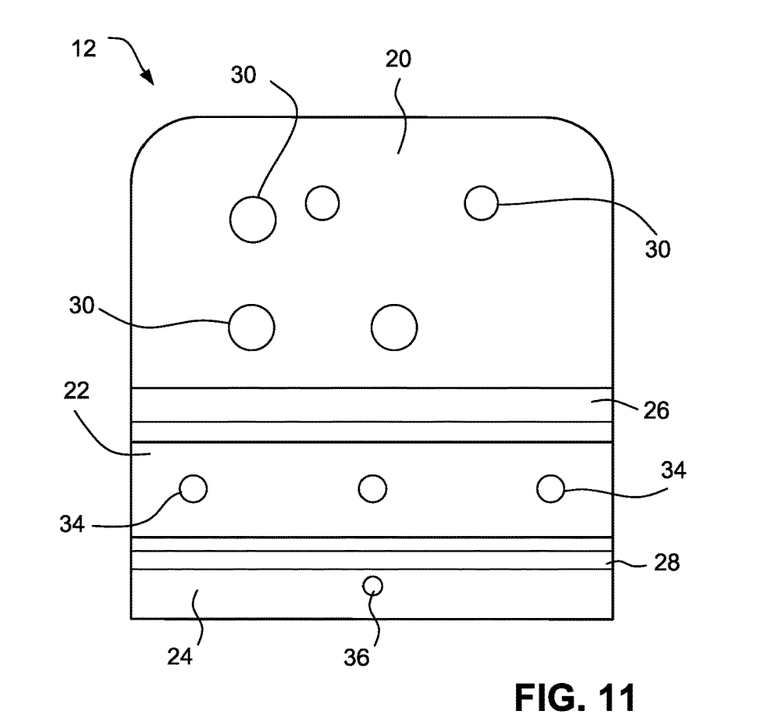
FIG. 11 is an inner view of the handle bracket of FIG. 1.
Figure 12:
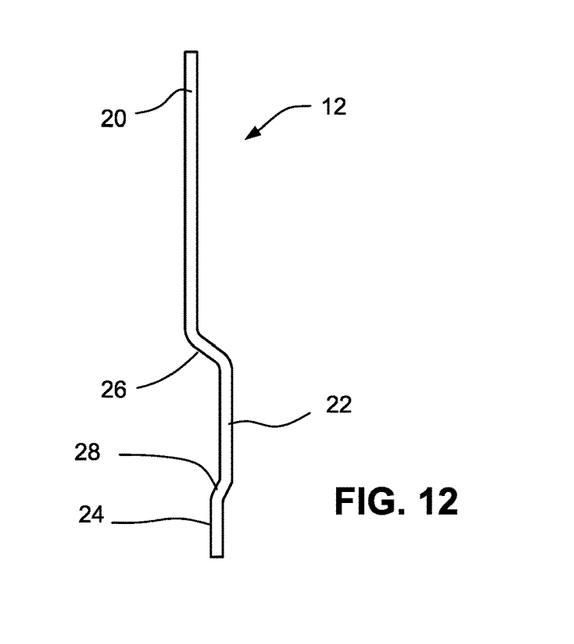
FIG. 12 is an end view of the handle bracket of FIG. 1.

As best shown in FIGS. 10-12, an illustrative bracket 12 includes a first portion 20 having a first side and a second side, a second portion 22 having a first side and a second side, and a third portion 24 having a first side and a second side. The first portion 20 is generally flat and rectangular, and it generally lies in a first plane. The second portion 22 is generally flat and rectangular, and it generally lies in a second plane generally parallel to and spaced from the first plane. The third portion 24 is generally flat and rectangular, and it generally lies in a third plane generally parallel to, spaced from, and between the first and second planes.

The first portion 20 is connected to the second portion 22 by a first generally S-shaped transition region 26, the first transition region extending in a direction away from the second side of the first portion and toward the first side of the second portion. The second portion 22 is connected to the third portion 24 by a second generally S-shaped transition region 28, the second transition region extending in a direction away from the second side of the first portion and toward the first side of the third portion. The first transition region 26 extends further from the second side of the first portion 20 than does the second transition region 28.

Although the first, second, and third portions 20, 22, 24 are described above as generally flat, any or all of them could include surface contour, for example, ridges, bumps, concavities, and the like. Also, although the first, second, and third portions 20, 22, 24 are described above as generally rectangular, any or all of them could have other shapes. Further, although the first and second transition regions 26, 28 are described as generally S-shaped, either or both of them could have other configurations, for example, a planar configuration.

The first portion 20 defines a plurality of first apertures 30 there through. The first apertures 30 may be located to align with corresponding apertures in one or more different mating grab handle mounts 64 that might be attached to a first (or outer or front or mounting) surface of the first portion 20, as will be discussed further below. FIG. 10 shows a bracket 12 having four first apertures 30 in a first configuration, two of the first apertures having a first diameter, and another two of the first apertures having a second diameter greater than the first diameter. FIG. 11 shows a bracket 12 having five first apertures 30 in a second configuration, two of the first apertures having a first diameter, and three of the first apertures having a second diameter greater than the first diameter. In other embodiments, more or fewer than four or five first apertures 30 could be provided, and each such first aperture could be sized and located as desired.

As best shown in FIG. 10, a plurality of captive nuts 32 may be disposed on a second (or rear) surface of the first portion 20 opposite the first surface thereof, each such captive nut in registration or alignment with a corresponding one of the first apertures 30. The captive nuts 32 may be distinct elements post-attached to the bracket 12, for example, by bonding or welding, or they may be formed integrally or monolithically with the bracket. The captive nuts 32 may be configured with a rear face that is generally co-planar with a rear face of the second portion 22. Alternatively, the first apertures 30 may be internally threaded for and the captive nuts 32 may be omitted.

The second portion 22 defines a plurality of second apertures 34 in a linear arrangement there through. The second apertures 34 may be located to correspond with the locations of corresponding apertures in the door frame 14, as will be discussed further below. The drawings show three second apertures 34, but more or fewer than three second apertures could be provided, and they could be sized and located as desired. One or more of the second apertures 34 could be configured to receive a fastener 58, for example, a rivet or threaded fastener, there through for attaching the bracket 12 to the door frame 14, as will be discussed further below. A captive nut (not shown) similar to the captive nuts 32 may be disposed in a similar manner on a rear surface of the second portion 22 for receiving such a threaded fastener. In an embodiment, the foregoing second aperture 34 could be threaded for receiving such a threaded fastener.

The third portion 24 may define a third aperture 36 there through. FIG. 11 shows a bracket 12 having a third portion 24 defining a single third aperture 36. Where provided, the third aperture is configured to receive a fastener (not shown), for example, a rivet or threaded fastener, there through for attaching the bracket 12 to the door frame 14, as will be discussed further below. A captive nut (not shown) similar to the captive nuts 32 may be disposed in a similar manner on a rear surface of the third portion 24 for receiving such a threaded fastener. In an embodiment, the third aperture 36 could be threaded for receiving such a threaded fastener. In a further embodiment, for example, the embodiment shown in FIG. 10, the third aperture could be omitted, and the bracket 12 could be attached to the door frame 14 in another manner.

The door frame 14 may be formed as an extrusion or in any other suitable manner. The door frame 14 is shown as an elongated, generally Z-shaped, member having a first flange 38, a web 40 generally perpendicular to the first flange, and a second flange 42 generally perpendicular to the web. As such, the first and second flanges 38, 42 are generally parallel to each other, and they extend in opposite directions from opposite ends of the web 40. The first flange 38 is configured to be placed against or proximate a surface of the wall 16. A seal may be disposed between the first flange 38 and the wall 16. The web 40 is configured to be placed against or proximate a free edge of the wall. The second flange 42 is configured to act as stop for the door 19.

First and second ribs 44, 46 extend outwardly from the first flange 38. The first flange 38 and the first and second ribs 44, 46 cooperate to form a first channel 48. The portion of the first flange 38 within the first channel 48 defines one or more fourth apertures 50 corresponding to the second apertures 34 defined by the second attachment portion 22 of the bracket 12. The free ends of the first and second ribs 44, 46 define respective lips 52, 54 that may be configured to retain a trim piece (not shown) to the first flange 38. The trim piece may be attached to the first flange 38 to obscure the interior of the first channel 48 and fasteners 56 used to attach the bracket 12 to a wall structure, as will be discussed further below. A fifth aperture (not shown) may be defined by the first flange 38 proximate the junction of the first flange and the web 40. The second flange 42 may define a second channel 60 configured to receive a seal member (not shown) that would be located between the second flange and the perimeter of the door (not shown) when the door is closed against the second flange.

Figure 13:
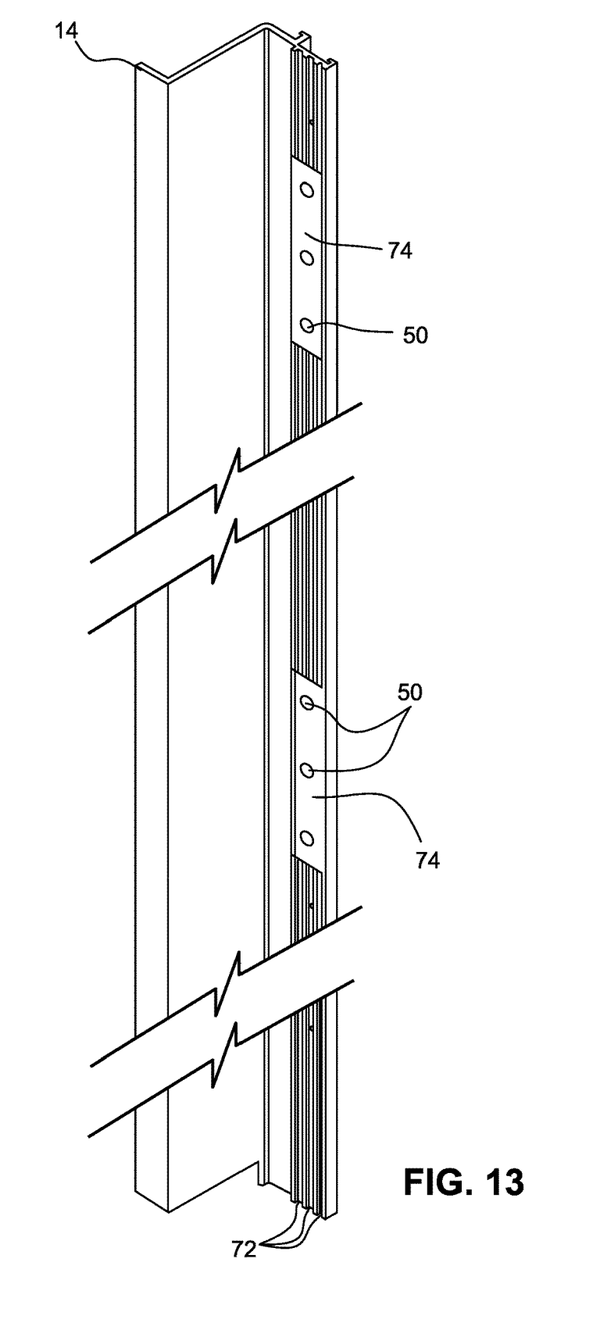
FIG. 13 is a perspective view of the door frame of FIG. 1.

Additional ribs 72 may extend inwardly from the first flange 38 of the door frame 14. As best shown in FIG. 13, the additional ribs 72 may be notched or fully or partially removed in region 74 to which the bracket 12 is to be attached, as will be discussed further below. With the additional ribs 72 at least partially removed in the region 64 to which the bracket 12 is to be attached, at least a portion of the bracket 12 may be recessed with respect to the free ends of the additional ribs when the bracket is attached to the door frame 14, as discussed further below.

The bracket 12 may be integrated with the door frame 14 as follows. The bracket 12 may be disposed against the rear or inner surface of the first flange 38 of the door frame 14 such that the second apertures 34 align with the corresponding fourth apertures 50 in the first flange. The fastener 58 may be inserted through one of the second apertures 34 and a corresponding one of the fourth apertures 50 to secure the bracket 12 to the door frame 14. The system may include a panel 59 (see FIG. 5), where the first flange 38 is fastened to the panel 59 with the bracket 12 between the first flange 38 and the panel 59. In embodiments including the third aperture 36 in the bracket 12 and the corresponding fifth aperture (not shown) in the first flange 38, the third and fifth apertures may be aligned with each other and a fastener may be inserted through the third and fifth apertures to secure the bracket 12 to the door frame 14. Alternatively, the bracket 12 could be spot welded or otherwise joined to the door frame 14.

With the bracket 12 attached to the door frame 14, the door frame may be placed against the wall of the structure about the opening therein. Screws, bolts, or other mechanical fasteners may then be inserted through the fourth apertures 50 of the door frame 14 and through the second apertures 34 of the bracket 12 and into or through the structure adjoining the opening, thereby simultaneously fastening the bracket 12 and the door frame 14 to the structure. The locations of the second apertures 34 of the bracket 12 and the corresponding fourth apertures 50 of the door frame 14 may be selected to coincide with corresponding reinforcement in the wall of the structure. For example, the locations of the second apertures 34 of the bracket 12 and the corresponding fourth apertures 50 of the door frame 14 may be selected to coincide with a jamb adjacent the opening in the wall of the structure. Additional elements, for example, additional fasteners, may be used to further secure the door frame 14 to the structure.

As suggested above, the bracket 12 may be proud of the inner surface of the first flange 38 when the bracket is attached thereto. For example, the bracket 12 may be proud of the free ends of the additional ribs 72 when the bracket is attached to the first flange 38. This configuration may yield a gap between the wall 16 and portions of the first flange 38 adjacent the bracket 12. This effect may be mitigated by notching or at least partially removing the additional ribs 72 in the region 74 to which the bracket 12 is attached, such that the surface of the bracket 12 facing the wall 16 may be flush with (or less proud of) the free ends of the additional ribs 72. (In embodiments not including the additional ribs 72, the surface of the first flange 38 abutting the bracket 12 may be notched in a similar manner such that the surface of the bracket 12 facing the wall 16 may be flush with (or less proud of) the adjacent portions of the surface of the first flange.) Alternatively or additionally, this effect may be mitigated by providing a compressible seal (not shown) between the wall 16 and the door frame 14 and integrated bracket 12, the seal being configured to accommodate irregularities in the surfaces bearing against it. Such a seal may be compressed a first amount in regions abutting the bracket 12. If the bracket 12 is proud of the free ends of the additional ribs 72, the seal may compress a second, lesser amount in regions not abutting the bracket.

With the door frame 14 so attached, a trim piece (not shown) may be fitted and attached to the first channel 48 of the first flange 38 of the door frame 14. Also, a mating mount 64 of a grab handle 18 may be attached to a respective bracket 12 by inserting threaded fasteners 68 through the first apertures 30 in the bracket 12 and corresponding apertures 76 in the mating grab handle mount 64 and into the captive nuts 32 (or threads of the first apertures 30). The fasteners 68 may be configured so as to not extend beyond the rear face of the captive nuts 32 and/or the rear face of the second attachment portion 22. As discussed above, the first apertures 30 of the bracket 12 may be located as may be desired so as to accommodate the mating of a variety of different mating grab handle mounts 64 thereto.

The system 10 including the bracket 12 and the door frame 14 could be pre-fabricated and shipped to a user with the bracket 12 attached to the door frame 14 as discussed above. Alternatively, the bracket 12 and the door frame 14 could be provided as discrete pieces for assembly by a user. The door frame 14 could be provided with or without the fourth aperture 50 and/or the fifth aperture (not shown) pre-formed in the door frame 14. In the latter embodiment, the user, for example, could select a grab handle 18, test fit the mounts 64 of the grab handle 18 to a pair of the brackets 12, use the second and third apertures 34, 36 as templates to locate the fourth and fifth apertures 50, 62 in the door frame 14, and drill, punch or otherwise form the fourth and fifth apertures 50, 62 in the door frame 14. The user could then attach the system 10 to the structure as discussed above.

Features disclosed herein in connection with a given embodiment could be incorporated into other embodiment to the extent possible.

The invention claimed is:

1. A system comprising:
   an elongated door frame member having a generally Z-shaped cross-section, the door frame member comprising:
      a web having a first side edge and a second side edge;
      a first flange extending in a first direction from the web proximate the first side edge of the web; and
      a second flange extending in a second direction from the web proximate the second side edge of the web, the first and second directions generally perpendicular to the web and the second direction generally opposite the first direction; and
   a door handle bracket comprising:
      a first portion, the first portion having a first surface and a second surface and defining a plurality of first apertures there through;
      a second portion, the second portion having a first surface contiguous with the first surface of the first portion and a second surface contiguous with the second surface of the first portion, the second portion defining a plurality of second apertures there through; and
      a third portion, the third portion having a first surface contiguous with the first surface of the second portion and a second surface contiguous with the second surface of the second portion;
      wherein the first surface of the second portion is recessed from both the first surface of the first portion and the first surface of the third portion; and
      wherein the second surface of the second portion is proud of both the second surface of the first portion and the second surface of the third portion;
   the door handle bracket being connected to the first flange of the door frame member on a wall side of the first flange with the first surface of the second portion facing the first flange.

2. The system of claim 1 further comprising a fastener fastening the bracket to the first flange.

3. The system of claim 1, the fastener comprising a rivet.

4. The system of claim 1, the door frame member further comprising an elongated rib extending from a surface of the first flange.

5. The system of claim 4, the rib being notched in a region of the surface of the first flange occupied by the bracket.

6. The system of claim 1, the surface of the first flange abutting the bracket being notched in the area occupied by the bracket.

7. A system comprising:
   an elongated door frame member having a generally Z-shaped cross-section, the doorframe member comprising:
      a web having a first side edge and a second side edge;
      a first flange extending in a first direction from the web proximate the first side edge of the web; and
      a second flange extending in a second direction from the web proximate the second side edge of the web, the first and second directions generally perpendicular to the web and the second direction generally opposite the first direction;
   a door handle bracket comprising:
      a first portion, the first portion having a first surface and a second surface and defining a plurality of first apertures there through;
      a second portion, the second portion having a first surface contiguous with the first surface of the first portion and a second surface contiguous with the second surface of the first portion, the second portion defining a plurality of second apertures there through; and
      a third portion, the third portion having a first surface contiguous with the first surface of the second portion and a second surface contiguous with the second surface of the second portion;
      wherein the first surface of the second portion is recessed from both the first surface of the first portion and the first surface of the third portion; and
      wherein the second surface of the second portion is proud of both the second surface of the first portion and the second surface of the third portion;
   the bracket connected to the first flange of the door frame member with the first surface of the second portion facing the first flange; and
   a panel, the first flange of the door frame member fastened to the panel with the bracket between the first flange and the panel.

8. The system of claim 1 further comprising threading associated with at least one of the second apertures.

9. The system of claim 8, the threading comprising a captive nut attached to the second portion of the bracket in registration with the at least one of the second apertures.

10. The system of claim 8, the threading comprising threading formed into the at least one of the second apertures.

11. The system of claim 1 further comprising a grab handle mount fastened to the first portion of the bracket.

12. The system of claim 11 further comprising a fastener extending through an aperture in the grab handle mount and into threading associated with a corresponding one of the first apertures.

13. A system for connecting a grab handle to a wall, the system comprising:
- a door frame member having a generally Z-shaped cross-section and including:
  - a web having a first side edge and a second side edge;
  - a first flange extending in a first direction from the web proximate the first side edge of the web; and
  - a second flange extending in a second direction from the web proximate the second side edge of the web, the first and second directions generally perpendicular to the web, and the second direction generally opposite the first direction; and
- a door handle bracket including first, second and third sections in parallel offset planes, wherein the door handle bracket is connected to the first flange of the door frame member on a wall side of the first flange, and wherein the grab handle is securable to the door handle bracket.

* * * * *